Oct. 17, 1950    D. A. PORTER ET AL    2,526,501
ELECTRICAL CONTACT FOR CONVEYING LIGHTING CURRENT
TO LAMPS ON A TILTABLE TRUCK BODY WHEN
THE BODY IS IN THE LOWERED POSITION
Filed May 11, 1948
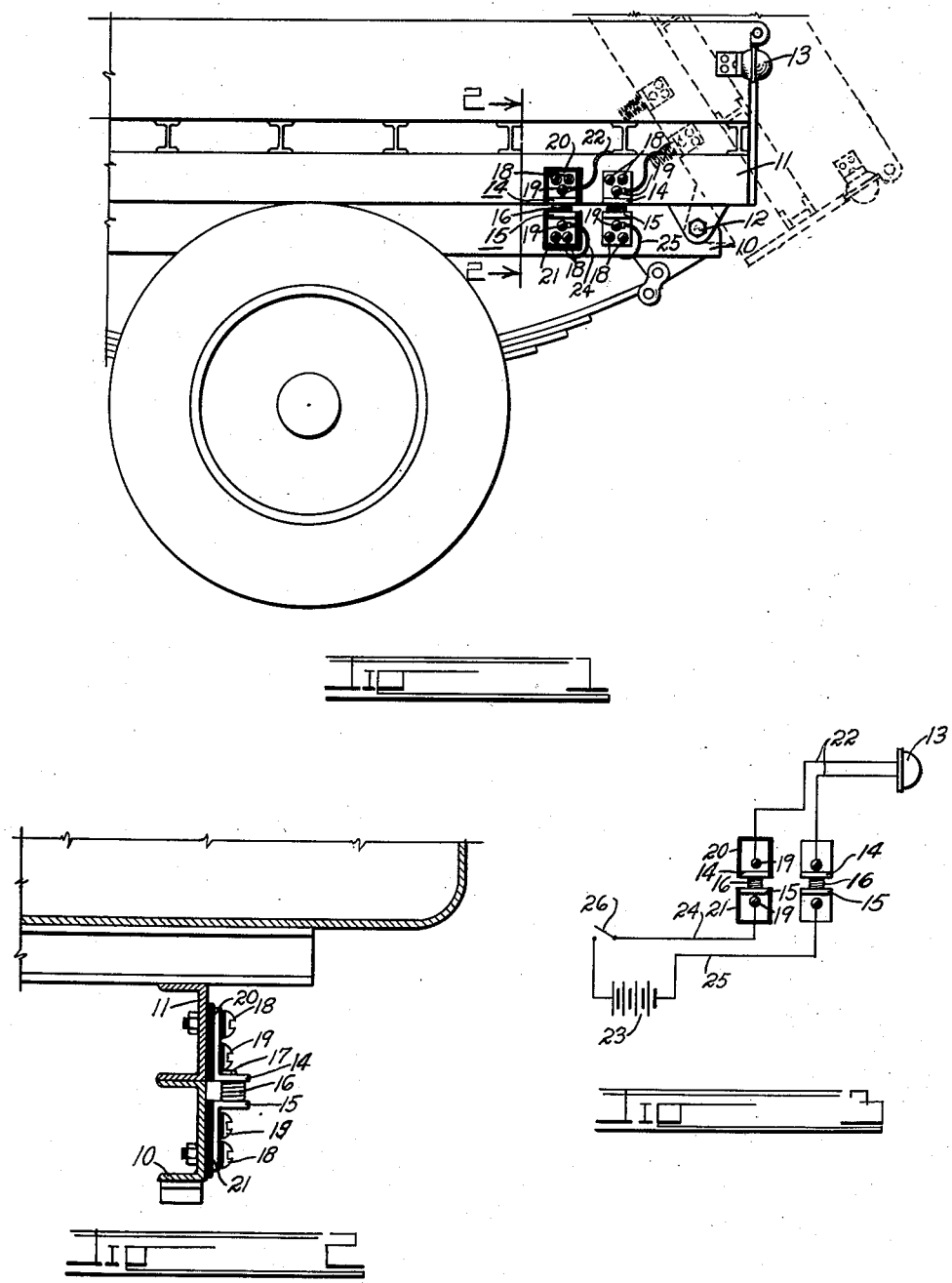
INVENTORS
Donald A. Porter
BY Everett E. Shelden
ATTORNEY Patented Oct. 17, 1950

2,526,501

UNITED STATES PATENT OFFICE 2,526,501

ELECTRICAL CONTACT FOR CONVEYING LIGHTING CURRENT TO LAMPS ON A TILTABLE TRUCK BODY WHEN THE BODY IS IN THE LOWERED POSITION

Donald A. Porter and Everett E. Shelden, Douglas, Wyo.

Application May 11, 1948, Serial No. 26,266

3 Claims. (Cl. 240—8.3)

Trucks and other road vehicles are required to carry clearance lights in order to disclose to the approaching motorists the clearance or width of the truck or vehicle. On dump trucks having bodies which tilt for dumping purposes, it is exceedingly difficult to maintain the clearance lights in operating condition. If wires are run to these lights, the constant flexing of the wires during the dumping operations soon renders them inoperative. If one circuit is grounded, the grease and accumulation of foreign matter on the body hinge breaks the ground circuit and often results in burning out the clearance lights.

The principal object of this invention is to provide an inexpensive and highly efficient contact device for conveying electrical current to the lights on a dump body which will always assure a closed circuit when the body is in the lowered or traveling position, and which will break the circuit to the lights when the body is in the elevated or dumping position, so that all open circuits due to broken wires and poor grounding will be eliminated.

Another object of the invention is to so construct the device that it can be easily, quickly, and economically applied to present trucks and dump bodies.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary side elevation of the rear portion of a conventional dump truck, illustrating the invention in place thereon;

Fig. 2 is an enlarged, vertical section, taken on the line 2—2, Fig. 1; and

Fig. 3 is a circuit diagram, illustrating the improved devices in Fig. 1.

The chassis of a typical dump truck is indicated at 10. The sill of the dump body is indicated at 11, and the hinge pin connecting the sill 11 with the chassis 10 is indicated at 12. A typical clearance light is indicated at 13. The dumping position of the body is indicated in broken line.

The improved contact device consists of an upper angle clip 14 and a lower angle clip 15. The clips 14 and 15 are similar. The upper clip 14 carries a helical spring 16 attached thereto in any desired manner, such as by welding or brazing, or by extending one extremity of the spring through the horizontal leg of the clip, as shown at 17. Both clips are drilled for the reception of attachment bolts 18 and for the reception of binding screws 19.

In installing the device, two of the upper clips 14 are secured to the side of the sill 11 by means of the attachment bolts 18. One of the clips 14 is mounted on a plate of insulating material 20, and its bolts 18 are insulated from the clip by means of insulating washers and insulating sleeves. Two of the lower clips 15 are secured to the chassis 10 immediately below the clips 14 by means of the attachment bolts 18. One of the clips 15 is also insulated from the chassis 10 by means of a plate 21 of electrical insulating material, and its bolts 18 are also insulated from the clip 15, similarly to the insulated upper clip 14.

The two upper clips 14 are connected by means of lamp conductors 22 with the clearance lamps 13. The two lower clips 15 are connected in circuit with the vehicle battery, indicated at 23, through a live conductor 24 and ground conductor 25. The circuit may be broken by means of a conventional lamp switch 26.

The springs 16 close the circuit between the clips 14 and 15 when the sills 11 are in the horizontal traveling position. When the body is elevated for dumping purposes, the springs lift with the clips 14 away from the clips 15, as shown in broken line in Fig. 1, so as to break the circuit therewith. The springs again contact the clips 15 to complete the circuit when the body is lowered.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A dump vehicle including a chassis having chassis bars and a body mounted for vertical tilting movement from a lowered position at rest upon the chassis bars to a raised position for dumping, a clearance light upon said body, and a circuit for the light including stationary and movable contacts carried respectively by the chassis and the body in insulated relation thereto, the movable contacts on the body being disposed over the stationary contacts on the chassis and engaging the said stationary contacts to close the circuit when the body is in its lowered position.

2. A dump vehicle comprising a chassis having chassis bars, a body having sills along its sides and being mounted for vertical tilting movement from a lowered position disposing its sills at rest upon the chassis bars to a raised position for dumping, clearance lights upon said body, companion contacts stationarily and movably mounted against outer side faces of a chassis bar and a sill respectively in insulated relation thereto and having portions projecting outwardly therefrom in position for engagement with each other when the body is in its lowered position, and circuit wires for the lights connected with the said contacts.

3. A dump vehicle comprising a chassis having chassis bars, a body having sills along its sides hinged at their rear ends to the chassis bars for vertical tilting to a dumping position and resting upon the chassis bars when in a lowered position, a clearance light upon said body, a source of electric energy carried by the body, contacts carried by one chassis bar, contacts carried by one sill and disposed over the contacts carried by the chassis bar, each contact consisting of a metal clip having a vertical portion formed with fastener receiving openings and a horizontal portion, bolts passing through said openings, insulation for the vertical portion and its bolts, screws carried by the vertical portions, conductors secured to the clips by the screws, and springs carried by the horizontal portions of the clips upon the sill and bearing against the horizontal portions of the clips carried by the chassis bar to complete a circuit through the light when the body is in its lowered position.

DONALD A. PORTER.
EVERETT E. SHELDEN.

REFERENCES CITED

The following references are of record in the file of this patent:

UNITED STATES PATENTS

| Number | Name | Date |
|---|---|---|
| 481,711 | Bessey | Aug. 30, 1892 |
| 595,963 | McCaughey | Dec. 21, 1897 |
| 2,067,485 | Gardner et al. | Jan. 12, 1937 |
| 2,101,748 | Michel et al. | Dec. 7, 1937 |
| 2,228,456 | Hobbs | Jan. 14, 1941 |
| 2,395,571 | McMillan | Feb. 26, 1941 |